(12) United States Patent
Onose

(10) Patent No.: US 10,987,810 B2
(45) Date of Patent: Apr. 27, 2021

(54) ROBOT SYSTEM

(71) Applicant: FANUC CORPORATION, Yamanashi (JP)

(72) Inventor: Nao Onose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 94 days.

(21) Appl. No.: 16/410,449

(22) Filed: May 13, 2019

(65) Prior Publication Data

US 2019/0351554 A1    Nov. 21, 2019

(30) Foreign Application Priority Data

May 15, 2018    (JP) .............................. JP2018-093489

(51) Int. Cl.
G05B 19/04    (2006.01)
G05B 19/18    (2006.01)
B25J 9/16    (2006.01)
G06T 7/60    (2017.01)
B25J 19/06    (2006.01)
G06T 7/70    (2017.01)

(52) U.S. Cl.
CPC ............. B25J 9/1676 (2013.01); B25J 19/06 (2013.01); G06T 7/60 (2013.01); G06T 7/70 (2017.01); G06T 2207/30196 (2013.01)

(58) Field of Classification Search
CPC . B25J 19/06; B25J 9/1676; B25J 19/02; B25J 5/00; F16P 3/142; F16P 3/14; F16P 3/144; G06T 2207/30196; G06T 7/60; G06T 7/70; G05B 2219/40202; G05B 19/4061; G05B 2219/40201; G05B 2219/40219; G05B 2219/49141; Y10S 901/49

See application file for complete search history.

(56) References Cited

U.S. PATENT DOCUMENTS 9,513,606 B1 * 12/2016 Larsen ................... B25J 9/1676
10,500,729 B2 * 12/2019 Frisk ...................... B25J 9/1676
2003/0076224 A1    4/2003 Braune
(Continued)

FOREIGN PATENT DOCUMENTS

CN    102201030 A    9/2011
CN    103802117 A    5/2014
(Continued)

OTHER PUBLICATIONS

Japanese Decision to Grant a Patent dated Jul. 14, 2020, for Japanese Patent Application No. 2018-093489.
(Continued)

*Primary Examiner* — Harry Y Oh
(74) *Attorney, Agent, or Firm* — Karceski IP Law, PLLC

(57) ABSTRACT

This robot system includes a robot, and a controller which sets an operation limitation area for limiting operations of the robot, and the controller resets the operation limitation area by using at least one of information about a floor surface where an object person conducts tasks at a surrounding area of the robot, information about a structure with which the object person may come into contact, information about a non-target object who exists in a vicinity of the object person, and information about another robot which exists in a vicinity of the object person.

6 Claims, 8 Drawing Sheets

| AREA | ANTI-SLIP PROPERTY |
|---|---|
| AREA AR1 | 0.5 |
| ANOTHER AREA | 0.9 |

(56) References Cited

U.S. PATENT DOCUMENTS

| | | | |
|---|---|---|---|
| 2006/0108960 A1 | 5/2006 | Tanaka et al. | |
| 2008/0161970 A1 | 7/2008 | Adachi et al. | |
| 2009/0043440 A1* | 2/2009 | Matsukawa | G05D 1/0214 |
| | | | 701/25 |
| 2009/0125145 A1 | 5/2009 | Adachi et al. | |
| 2009/0222134 A1 | 9/2009 | Franke et al. | |
| 2009/0271026 A1* | 10/2009 | Lerisson | F16P 3/14 |
| | | | 700/177 |
| 2010/0222954 A1 | 9/2010 | Ichinose et al. | |
| 2011/0238212 A1 | 9/2011 | Shirado et al. | |
| 2011/0264266 A1 | 10/2011 | Kock | |
| 2012/0043831 A1* | 2/2012 | Sakakibara | B25J 19/06 |
| | | | 307/326 |
| 2012/0290132 A1* | 11/2012 | Kokubo | B25J 9/1666 |
| | | | 700/255 |
| 2014/0005827 A1 | 1/2014 | Ogawa et al. | |
| 2014/0135984 A1 | 5/2014 | Hirata | |
| 2014/0277723 A1 | 9/2014 | Nishimura et al. | |
| 2015/0158178 A1 | 6/2015 | Burmeister et al. | |
| 2016/0214263 A1* | 7/2016 | Terada | G05D 1/0274 |
| 2017/0129103 A1 | 5/2017 | Kokubo et al. | |
| 2017/0140491 A1 | 5/2017 | Hayashi et al. | |
| 2017/0197313 A1 | 7/2017 | Nishino | |
| 2017/0274523 A1 | 9/2017 | Sato | |
| 2017/0320212 A1 | 11/2017 | Frisk et al. | |
| 2018/0231961 A1* | 8/2018 | Naito | G06Q 50/04 |
| 2018/0232593 A1* | 8/2018 | Tani | B25J 19/06 |

FOREIGN PATENT DOCUMENTS

| | | |
|---|---|---|
| CN | 104044140 A | 9/2014 |
| DE | 102006048163 A1 | 2/2008 |
| EP | 1535706 A1 | 6/2005 |
| EP | 2369436 A2 | 9/2011 |
| EP | 2730377 A2 | 5/2014 |
| EP | 2783797 A2 | 10/2014 |
| EP | 3363602 A1 | 8/2018 |
| EP | 3418835 A1 | 12/2018 |
| EP | 3363602 B1 | 12/2020 |
| JP | 2003222295 A | 8/2003 |
| JP | 2004243427 A | 9/2004 |
| JP | 2010055498 A | 3/2010 |
| JP | 2010120139 A | 6/2010 |
| JP | 2011200947 A | 10/2011 |
| JP | 2011201001 A | 10/2011 |
| JP | 5035768 B | 9/2012 |
| JP | 5035788 B | 9/2012 |
| JP | 5205366 B | 6/2013 |
| JP | 2014008562 A | 1/2014 |
| JP | 5523386 B2 | 6/2014 |
| JP | 2017100207 A | 6/2017 |
| JP | 2017177321 A | 10/2017 |
| WO | 2004009303 A1 | 1/2004 |
| WO | 2006043396 A1 | 4/2006 |
| WO | 2017141567 A1 | 8/2017 |

OTHER PUBLICATIONS

Japanese Search Report from Registered Search Organization dated Jul. 14, 2020, for Japanese Patent Application No. 2018-093489.
Chinese Office Action dated Nov. 17, 2020, for Chinese Patent Application No. 201910393982.8.
German Office Action dated Feb. 1, 2021, for German Patent Application No. 102019112043.8.

* cited by examiner

| DISTANCE L1 | RADIUS r |
|---|---|
| MORE THAN 1m | 1m |
| LESS THAN 1m | 2m |

| AREA | ANTI-SLIP PROPERTY |
|---|---|
| AREA AR1 | 0.5 |
| ANOTHER AREA | 0.9 |

| OBJECT | RISK DEGREE |
|---|---|
| OBJECT PERSON | 30 |
| NON-TARGET OBJECT | 30 |

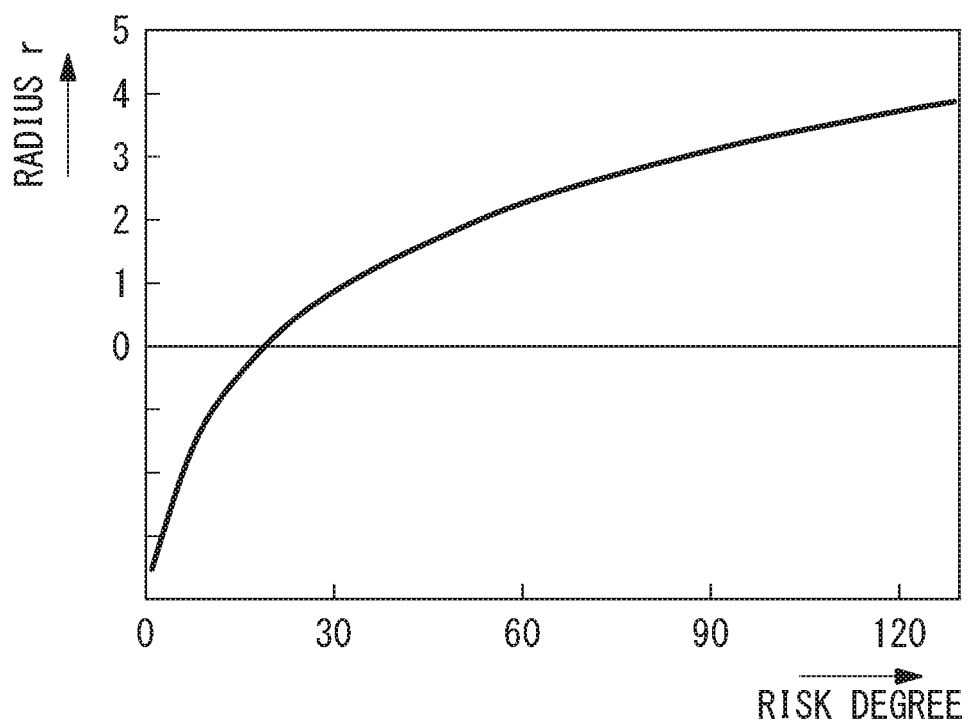

| DISTANCE L3 | RADIUS r |
|---|---|
| LESS THAN 1m | 2m |
| MORE THAN 1m | 1m |

| OPERATION STATE OF ANOTHER RORBOT | RISK DEGREE |
|---|---|
| HIGH SPEED | 100 |
| MIDIUM SPEED | 80 |
| LOW SPEED | 50 |

ROBOT SYSTEM

CROSS-REFERENCE TO RELATED APPLICATIONS

This application is based on and claims priority to Japanese Patent Application No. 2018-093489, filed on May 15, 2018, the entire content of which is incorporated herein by reference.

FIELD OF THE INVENTION

This invention relates to a robot system.

BACKGROUND OF THE INVENTION

Conventionally, there is a known robot system in which an operation limitation area of a robot is set at an surrounding area of an operator, who is a safety monitoring target, in such a case where the operator has a possibility of entering an operation range of the robot, and when the robot enters the operation limitation area, the known robot system performs safety operation control, emergency stop control, and the like of the robot. (See Japanese Unexamined Patent Application, Publication No. 2004-243427, for example.)

Also, a known robot system changes the operation limitation area of the robot in response to positions of the operator who is the safety monitoring target. (See Japanese Unexamined Patent Application, Publication No. 2003-222295, for example.)

SUMMARY OF THE INVENTION

A robot system according to a first aspect of the present invention includes a robot; and a controller which sets an operation limitation area for limiting operations of a robot; wherein, the controller resets the operation limitation area by using at least one of information about a floor surface of a work area where an object person conducts tasks at a surrounding area of the robot, information about a structure with which the object person may come into contact, information about a non-target object who exists in a vicinity of the object person, and information about another robot which exists in a vicinity of the object person.

BRIEF DESCRIPTION OF THE DRAWINGS

FIG. 9 is an example of conversion data of the embodiment.

FIG. 10 is an example of the correlation data of the embodiment.

FIG. 11 is an example of the correlation data of the embodiment.

DESCRIPTION OF EMBODIMENT(S) OF THE INVENTION

Figure 1:
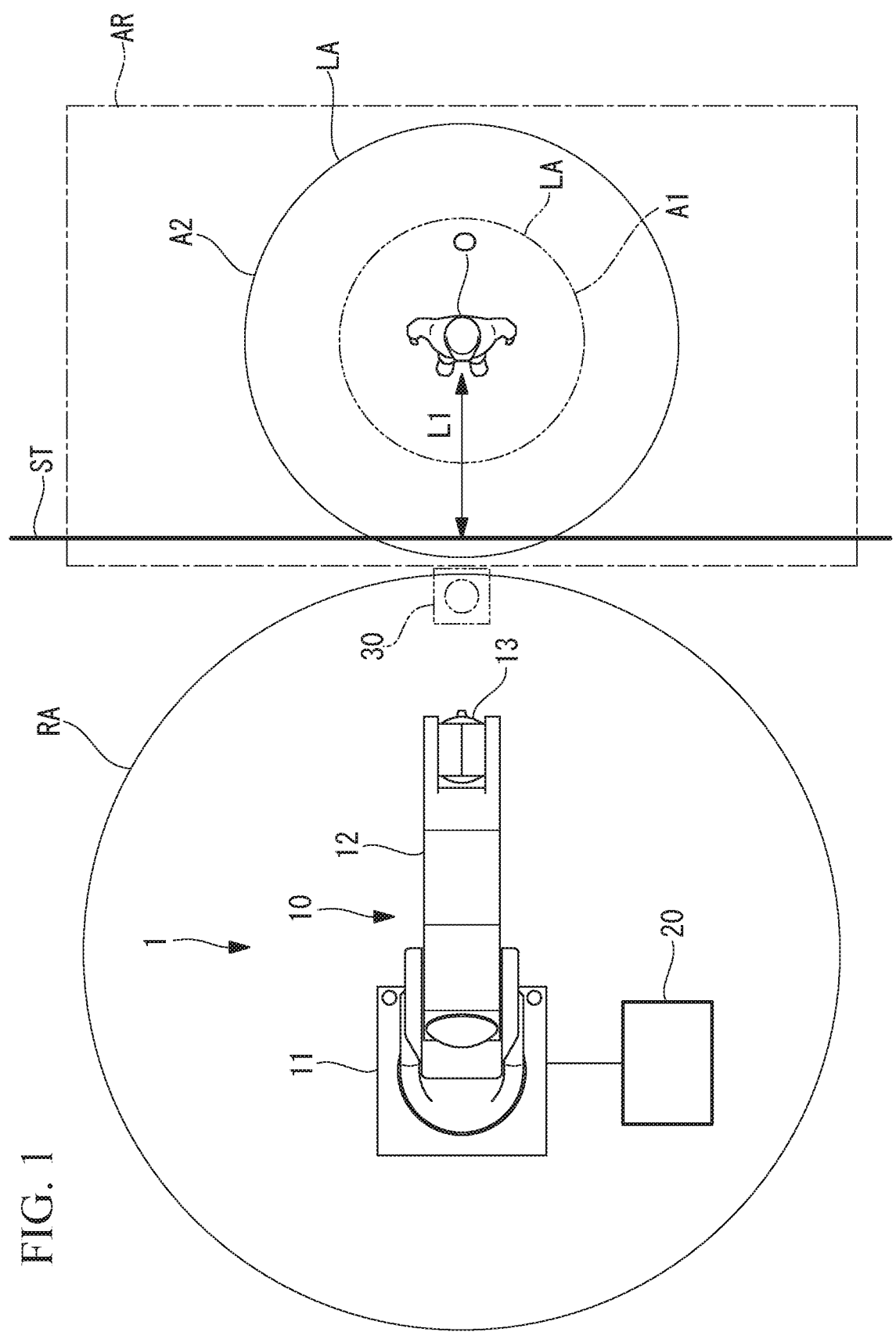
FIG. 1 is an exemplary diagram showing an entire structure of a robot system according to an embodiment of the present invention.

A robot system 1 according to an embodiment of the present invention will be described below with reference to the accompanying drawings.

The robot system 1 according to this embodiment includes a robot 10, a controller 20, and a sensor 30 which is provided so as to place an work area AR of an object person O, who conducts tasks in a surrounding area of the robot 10, in an angle of view of the sensor 30. The work area AR is an area existing in the vicinity of the robot 10, and data obtained by means of the sensor 30 is sent to the controller 20.

The sensor 30 is, for example, a two-dimensional camera, a three-dimensional camera, a three-dimensional sensor, and the like, which is provided at an upper side of the object person O, and the sensor 30 sequentially performs sensing of the work area AR of the object person O. Also, it is said that the sensor 30 sequentially captures images of the work area AR even in a case where the sensor 30 captures images of the work area AR at predetermined intervals.

For example, the robot 10 includes a base 11 which is fixed on a floor surface, an arm 12 which is provided on the base 11, and a tool 13 which is attached to a distal end portion of the arm 12. The robot 10 of this embodiment is a vertical articulated robot, however, other robots, such as a horizontal articulated robot, and the like may be used as the robot 10.

The arm 12 has a plurality of arm members and a plurality of joints. Also, the arm 12 includes a plurality of servo motors 12a for respectively driving the plurality of joints (refer to FIG. 2). Each of the joints has a built-in operation position detection device, such as an encoder and the like, and detected results of the operation position detection devices are transmitted to the controller 20.

The tool 13 is, for example, a gripping hand, a welding tool, a cutting tool, a deburring tool, a polishing tool, an assembling tool, a cleaning tool, and the like, and any tool may be used as the tool 13 as long as it conducts tasks as demanded. The tool 13 may include servo motors 13a for driving the tool 13 as necessary (refer to FIG. 2).

Figure 2:
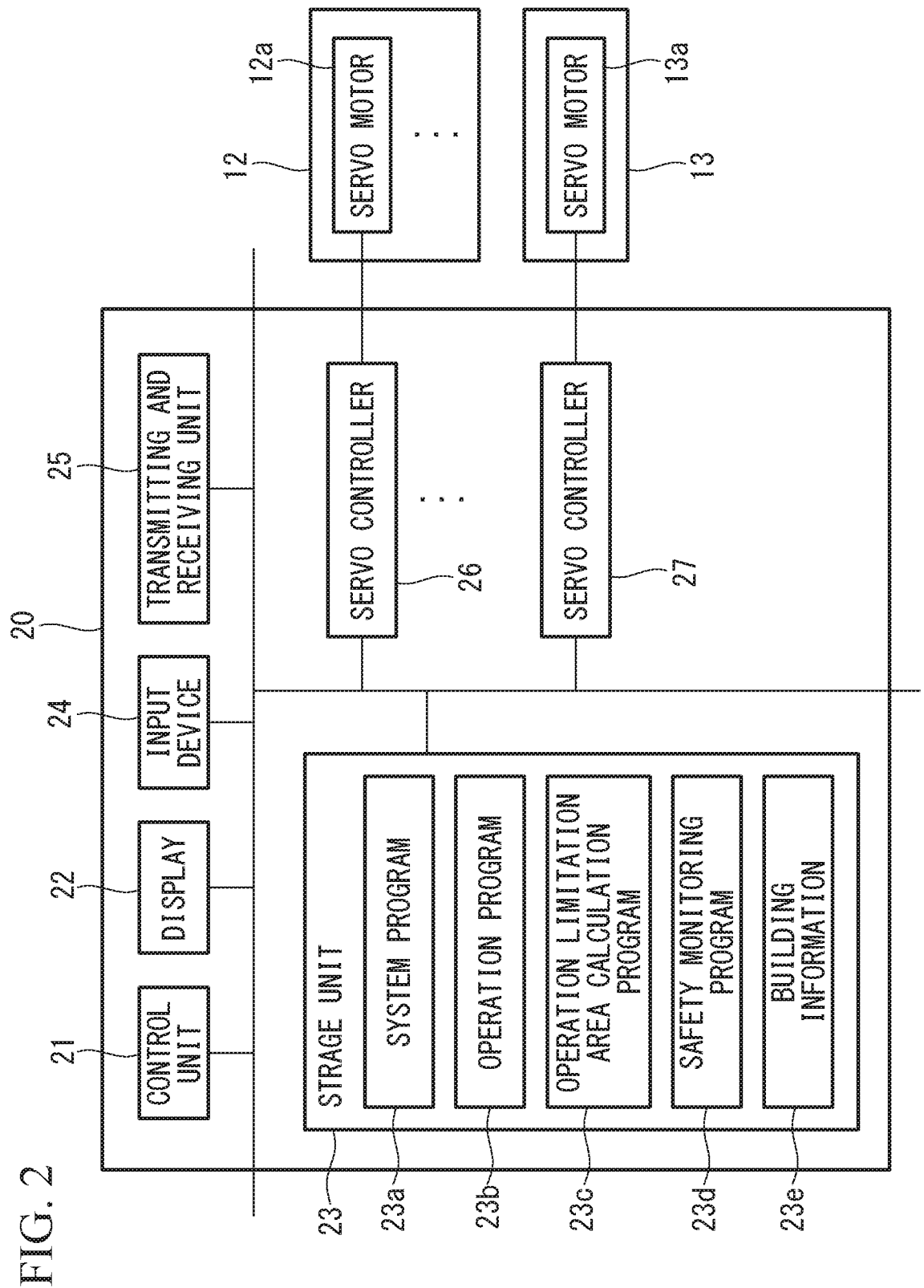
FIG. 2 is a block diagram of a controller of the robot system of the embodiment.

As shown in FIG. 2, the controller 20 includes a control unit 21 having a processor and the like, a display 22, a storage unit 23 having a non-volatile storage, a ROM, a RAM, and the like, an input device 24, which is a key board, a touch panel, an operation panel, and the like, a transmitting and receiving unit 25 for transmitting and receiving signals, a plurality of servo controllers 26 which respectively drives the plurality of servo motors 12a, and a servo controller 27 for driving the servo motor 13a. The input device 24 and the transmitting and receiving unit 25 function as an input unit. The controller 20 controls the servo motors 12a of the arm 12 of the robot 10, and the servo motor 13a of the tool 13.

A system program 23a is stored in the storage unit 23, and the system program 23a provides a basic function of the controller 20. Also, an operation program 23b is stored in the storage unit 23. The operation program 23b is a group of control commands which operates the arm 12 and the tool 13 at the time of performing operations by using the tool 13. With this configuration, the arm 12 and the tool 13 of the robot 10 perform operations in accordance with the operation program 23b.

An operation limitation area calculation program 23c and a safety monitoring program 23d are stored in the storage unit 23. Also, the controller 20 is capable of receiving building information 23e, and storing the received building information 23e in the storage unit 23. The building information 23e may be three-dimensional structure information, such as BMI (Building Information Modeling), and also, the building information 23e may be data which can be obtained by using detected results of a sensor for detecting the building information, such as a three-dimensional camera, a three-dimensional sensor, an infrared sensor, a sonic wave sensor, and the like, and the sensor for detecting the building information is provided at an upper side of the robot 10, the work area AR, and the like. It is also possible that the sensor for detecting the building information is held by means of an unmanned flying device so that the sensor for detecting the building information is placed at arbitrary places by means of the unmanned flying device.

The control unit 21 controls the robot 10 by using data, such as image data and the like, which is sent from the sensor 30 and the building information 23e, on the basis of the safety monitoring program 23d. In this embodiment, as a part of the control, the control unit 21 resets an operation limitation area LA (refer to FIG. 1, and the like), which is an area where the operations of the robot 10 are limited, while the robot 10 is operating. The limitation on the operations of the robot 10 refers to stopping of the operations of the robot 10, reduction of operation speed of the robot 10, starting of an avoidance operation of the robot 10, and the like.

For example, the building information 23e includes at least one of information about the floor surface of the work area AR, information about a structure with which the object person O existing in the work area AR may collide, information about a structure over which the object person O existing in the work area AR may stumble, and information about a fence or a wall W existing between the object person O and the robot 10. In addition, the above described fence or the wall W should be capable of preventing the robot 10 from coming into contact with the object person O.

Also, the control unit 21 of the controller 20 detects a position of the object person O in order to reset the operation limitation area LA. The control unit 21 performs known image processing, a known pattern matching, and the like on the data received from the sensor 30 so as to detect the positions of the object person O in series.

Examples of the resetting procedure of the operation limitation area LA will be described below.

Example 1

The control unit 21 enlarges size of the operation limitation area LA which is set at the surrounding area of the object person O when distance L1, which is the distance between a step ST and the object person O in the work area AR, becomes shorter (FIG. 1). In this example, at least information about a position of the step ST on the floor surface is stored in the storage unit 23 as the information about the floor surface of the work area AR. The information about the floor surface may include information about a shape of the step ST. There is a possibility that the step ST causes the object person O to tumble over or unintentionally lose balance.

Moreover, in Example 1, the information about the floor surface of the work area AR is stored in the storage unit 23, however, instead of this information, the storage unit 23 may store the information about a structure with which the object person O performing tasks in the work area AR may collide, the information about a structure over which the object person O performing the tasks in the work area AR may stumble, and the like. The structure stated here refers to a structure with which the object person O may come into contact, and there is a possibility that the structure causes the object person O to tumble over or unintentionally lose the balance.

Figures 3, 4:
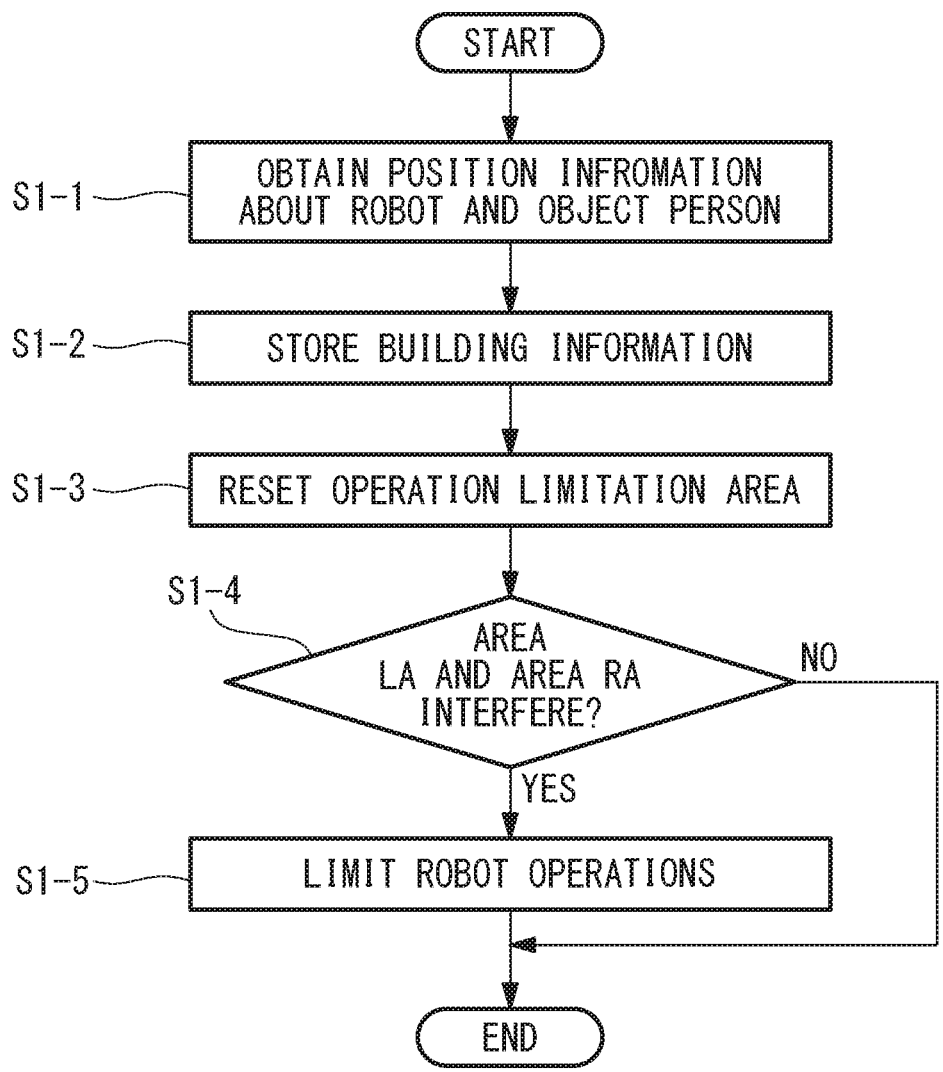
FIG. 3 is an example of correlation data of the embodiment.
FIG. 4 is a flow chart showing an example of processes performed by a control unit of the controller of the embodiment.

Here, as shown in FIG. 3, preferably, data which correlates the distance L1 with the size, the position, and the like of the operation limitation area LA is stored in the storage unit 23 of the controller 20. In the example shown in FIG. 3, the size of the operation limitation area LA is shown as a radius r of a circle whose center is located at the position of the object person O, and the distance L1 and the radius r of the operation limitation area AL are correlated with each other. An example of the position of the operation limitation area LA indicates a position of a border line of the operation limitation area LA with regard to the object person O or the robot 10. Instead of using the data, a formula which correlates the distance L1 with the size, position, and the like of the operation limitation area LA may be stored in the storage unit 23.

And, on the basis of the operation limitation area calculation program 23c, the control unit 21 changes the operation limitation area LA, which is set at the surrounding area of the object person O, to an area A2 from an area A1 when the distance L1 between the detected position of the object person O and the step ST becomes smaller than a predetermined value (refer to FIG. 1). That is to say, the control unit 21 resets the operation limitation area LA set at the surrounding area of the object person O in response to the distance L1 between the object person O and the step ST.

One example of the processes of the control unit 21, which is performed at this time, is described by referring to the flowchart shown in FIG. 4. Also, the processes in Steps S1-1 to S1-5 described in FIG. 4 are repeatedly performed at every several hundred milliseconds, for example.

The control unit 21 obtains information about the positions of the arm 12 of the robot 10 on the basis of the detected results of the operation position detection device of each of the joints of the arm 12, moreover, the control unit 21 obtains the information about the position of the object person O on the basis of the data received from the sensor 30 as described above (Step S1-1).

Also, as described above, the control unit 21 stores the received building information 23e in the storage unit 23 (Step S1-2). In addition, it is not necessary to perform Step S1-2 when the building information 23e has already been stored in the storage unit 23e.

Subsequently, on the basis of the operation limitation area calculation program 23c, the control unit 21 calculates the distance L1 between the detected position of the object person O and the step ST, and applies the calculated distance L1 to the data shown in FIG. 3 so as to reset the radius r of the operation limitation area LA whose center is the position of the object person O (step S1-3).

Subsequently, on the basis of the safety monitoring program 23d, the control unit 21 determines whether there is an interference between the reset operation limitation area LA and a robot operation area RA (refer to FIG. 1), which is a surrounding area of the robot 10 (Step S1-4).

And, when it is determined that the reset operation limitation area LA and the robot operation area RA cause interference with each other in Step S1-4, the control unit 21 limits the operations of the robot 10 on the basis of the safety monitoring program 23d (Step S1-5). In Step S1-5, the control unit 21 may change the limitation on the movements of the robot 10 in steps in response to the interference state which is determined in Step S1-4.

Also, in Step S1-4, the control unit 21 may determine whether there is interference between the robot 10 and the operation limitation area LA on the basis of a relative position of the arm 12 with respect to the reset operation limitation area LA.

Example 2

Figures 5, 6:
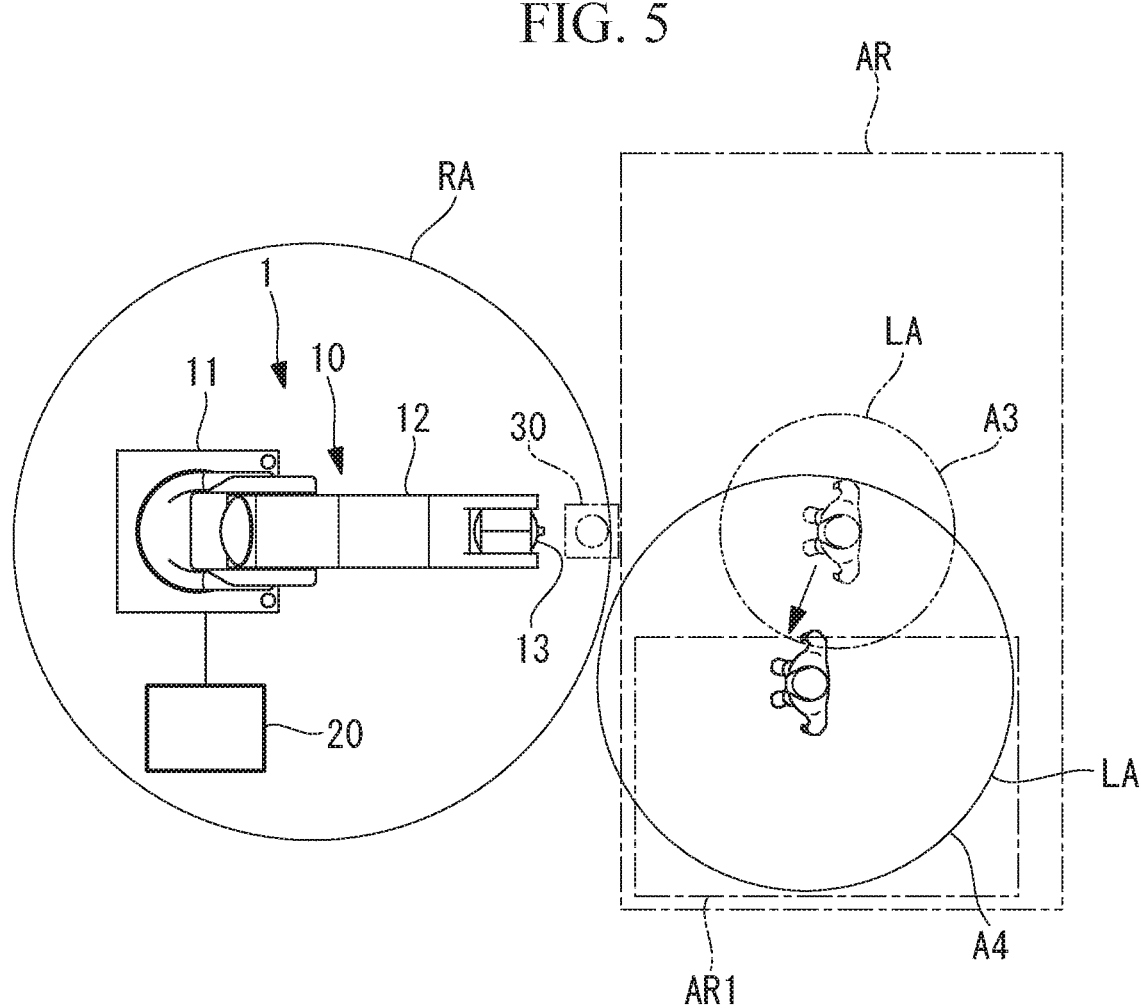
FIG. 5 is an exemplary diagram showing an entire structure of the robot system of the embodiment.
FIG. 6 is an example of correlation data of the embodiment.

The control unit 21 changes the operation limitation area LA set at the surrounding area of the object person O in response to information about slipperiness of the floor surface of the work area AR (refer to FIG. 5). In the example shown in FIG. 5, a part of the area AR1 in the work area AR is more slippery than other areas. As the information about the floor surface of the work area AR, at least information about an existence range of the area AR1 is stored in the storage unit 23 of the controller 20. There is a possibility that the floor surface of the area AR1 causes the object person O to tumble over or unintentionally lose the balance.

For example, as shown in FIG. 6, data which shows an index of anti-slip property of the area AR1 and that of the other area, respectively, are stored in the storage unit 23. It is also possible to use a known CSR value as the index of the anti-slip property. In the example shown in FIG. 6, the smaller the index, the more slippery the floor surface is.

Moreover, on the basis of the operation limitation area calculation program 23c, the control unit 21 changes the operation limitation area LA, which is set at the surrounding area of the object person O, from an area A3 to an area A4 when the detected position of the object person O enters the area AR1 (refer to FIG. 5). That is to say, the control unit 21 enlarges the operation limitation area LA set at the surrounding area of the object person O when the object person O enters the area AR1.

At this time, while the control unit 21 performs the Steps S1-1, S1-2, and S1-4 to S1-5 of the flow chart shown in FIG. 4, in Step S1-3, the control unit 21 applies the detected positions of the object person O to the data of the anti-slip property, which is shown in FIG. 6, so as to reset the radius r of the operation limitation area LA whose center is the position of the object person O.

Also, as the index of the anti-slip property, data of anti-slip property which is measured beforehand, data of anti-slip property which is derived by a material of the floor surface, and the like may be used. Also, information about hardness of the floor surface, information about surface roughness of the floor surface, information about deteriorated condition of the floor surface, and the like may be included in the information about the slipperiness of the floor surface in the work area AR.

Example 3

Figures 7, 8:
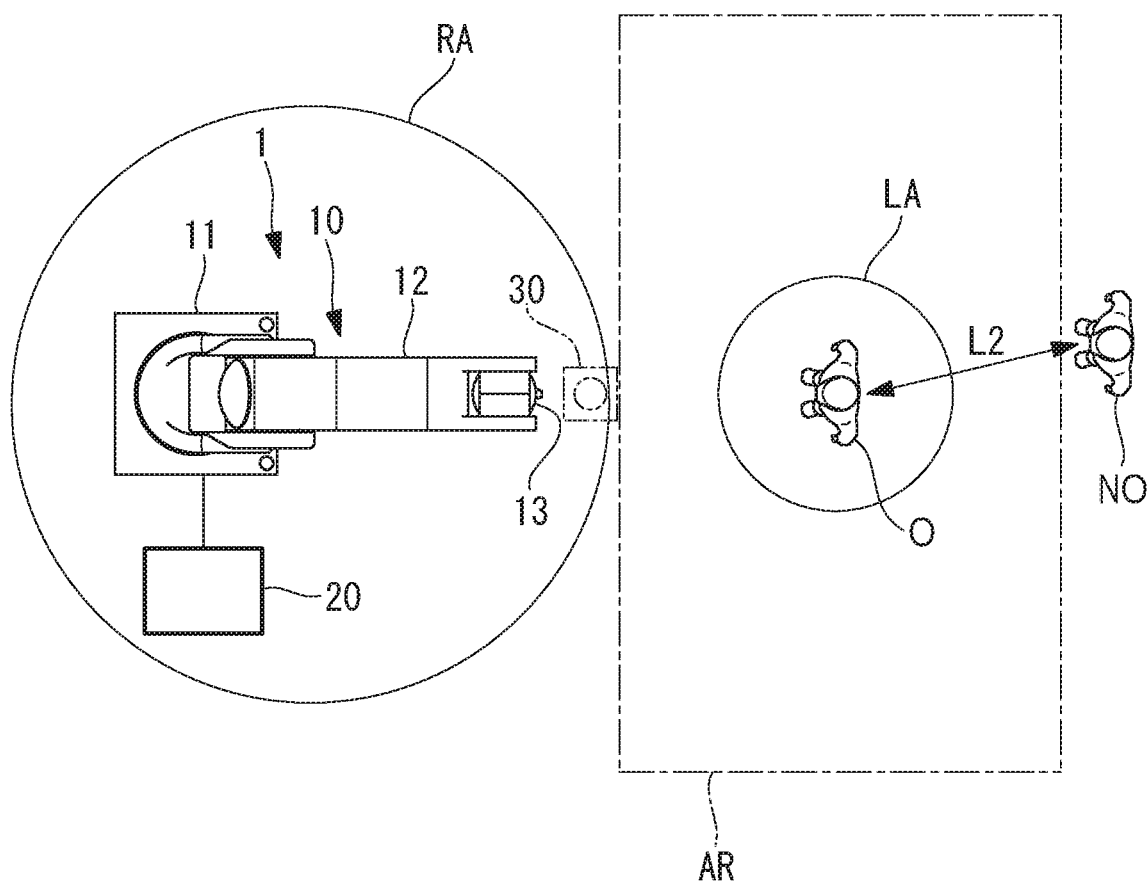
FIG. 7 is an exemplary diagram showing an entire structure of the robot system of the embodiment.
FIG. 8 is an example of the correlation data of the embodiment.

The control unit 21 changes the operation limitation area LA set at the surrounding area of the object person O in response to distance between a non-target object NO and the object person O, both of whom exist in the vicinity of the work area AR or inside the work area AR (refer to FIG. 7). In this example, as shown in FIG. 8, an index of risk degree of the non-target object NO is stored in the storage unit 23 as the information about the non-target object NO. In the example shown in FIG. 8, an index of risk degree of the object person O is also stored in the storage unit 23. Also, as shown in FIG. 9, conversion data which correlates the risk degree with the radius r of the operation limitation area LA is stored in the storage unit 23. With the conversion data shown in FIG. 9, changes in the radius r of the operation limitation area LA becomes smaller as the value of the risk degree becomes larger. This is to prevent the operation limitation area LA from becoming unnecessarily large. Instead of the conversion data, a formula which correlates the risk degree with the radius r of the operation limitation area LA may be stored in the storage unit 23.

Also, in this example, positions of the non-target object NO are sequentially detected by performing the known image processing, the known pattern matching, and the like on the data which is received from the sensor 30.

And, on the basis of the operation limitation area calculation program 23c, the control unit 21 sets the operation limitation area LA by using the radius r correlated with the risk degree, which is set to the object person O, when distance L2 between the non-target object NO and the object person O is more than a predetermined value, and the control unit 21 adds the risk degree which is set to the non-target object NO to the risk degree which is set to the object person O when the distance L2 between the non-target object NO and the object person O is smaller than the predetermined value, and the control unit 21 sets the operation limitation area LA by using the radius r correlated with a risk degree which is obtained by this addition. That is to say, when the distance L2 between the non-target object NO and the object person O is smaller than the predetermined value, the control unit 21 changes the operation limitation area LA in response to the risk degree of the non-target object O.

At this time, while the control unit 21 performs the Steps S1-1 and S1-4 to S1-5 of the flow chart shown in FIG. 4, in Step S1-3, the control unit 21 applies the data shown in FIG. 8 to the conversion data shown in FIG. 9 in response to the distance L2 between the non-target object NO and the object person O so as to reset the radius r of the operation limitation area LA whose center is the position of the object person O. Also, in Example 3, there is a case where Step S1-2 is not necessary to be performed.

In addition, in Example 1, the risk degree is set so that the risk degree corresponds to the shape of the step ST, types of the structure, positions of height direction of the structure, and the like, and the risk degree may be set so that the risk degree corresponds to the distance L1 between the step ST and the object person O, or that between the structure and the object person O. Moreover, in Example 2, the risk degree may be set so that the risk degree corresponds to the anti-slip property.

And, in Example 3, the risk degree of Example 1 and that of Example 2 may be added to the risk degree of Example 3, and the operation limitation area LA may be set by using the radius r which is correlated with the risk degree obtained by this addition. Also, the operation limitation area LA may be set by using only the risk degree obtained in Example 1 or the risk degree obtained in Example 2.

On the other hand, in Example 3, it is possible to use the data shown in FIG. 1 instead of using the data shown in FIG. 8 and FIG. 9. FIG. 10 shows an example of the data correlating the distance L2 between the object person O and non-target object NO, with the radius r of the operation limitation area LA. When the data of FIG. 10 is used, it is possible to change the radius r of the operation limitation area LA in response to the distance L2 between the object person O and the non-target object NO. Also instead of using the data of FIG. 10, it is possible to use a formula which correlates the distance L2 with the radius r of the operation limitation area LA.

Moreover, in Example 3, indexes of the risk degree of plural types of the non-target objects NO may respectively be stored in the storage unit 23 (refer to FIG. 11). In the example shown in FIG. 11, the index of the risk degree of the object person O is not stored in the storage unit 23. The control unit 21 is capable of identifying the types of the non-target objects NO by a symbol on a helmet or color of the helmet, which is worn by the non-target object NO. For example, a helmet worn by the operator who conduct tasks to other robot and a helmet worn by the visitor are different with each other so that the control unit 21 can identify whether the non-target object NO is the operator or the visitor.

Example 4

Figures 12, 13:
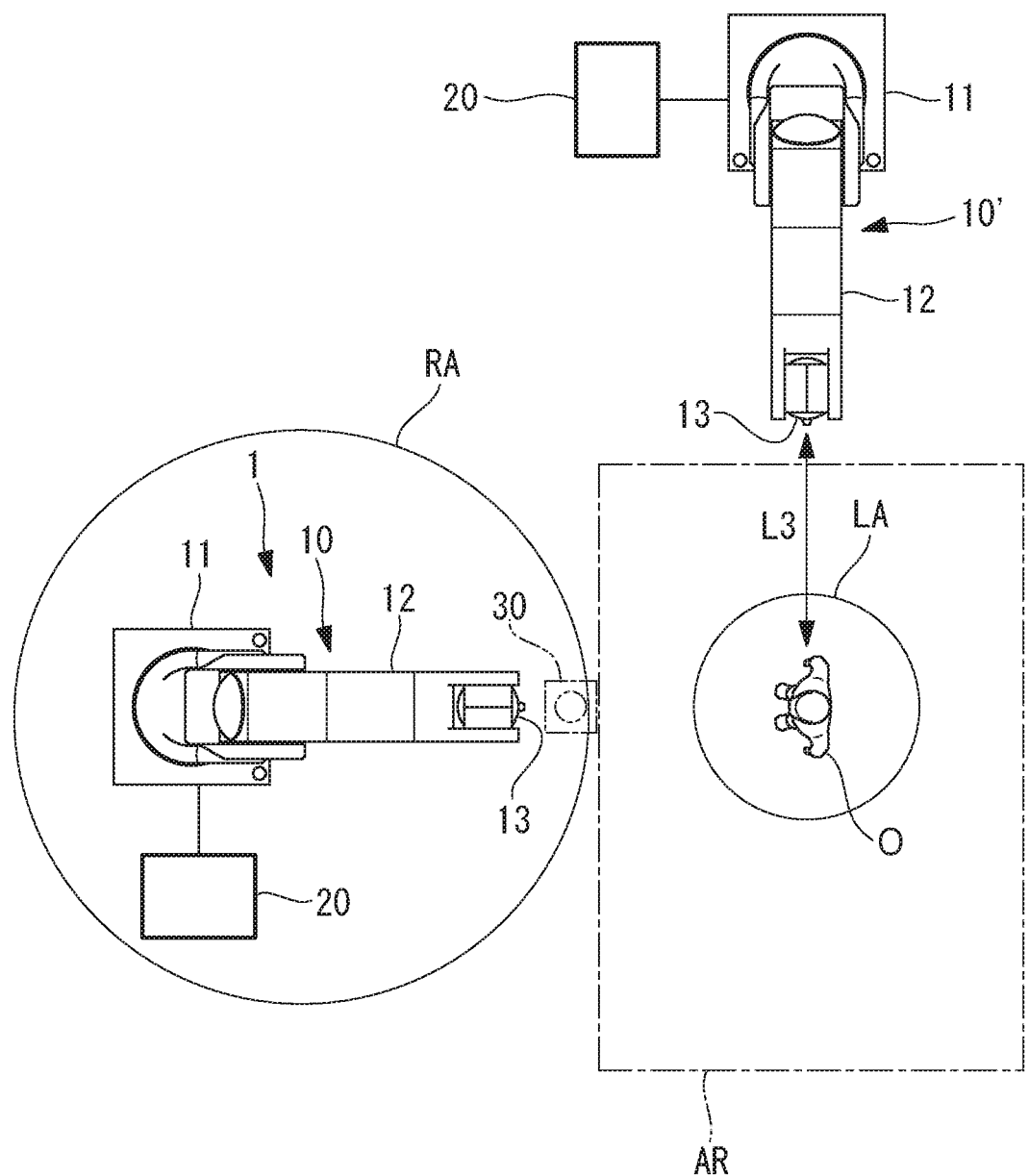
FIG. 12 is an exemplary diagram showing an entire structure of the robot system of the embodiment.
FIG. 13 is an example of the correlation data of the embodiment.

The control unit 21 changes the operation limitation area LA set at the surrounding area of the object person O in response to distance L3 between other robot 10', which is existing in the vicinity of the work area AR, and the object person O (refer to FIG. 12). As one example, the other robot 10' has a base 11 and an arm 12 which are the same as or similar to those of the robot 10, and the other robot 10' is controlled by a controller 20. Information about positions of the arm 12 of the other robot 10' is sequentially sent to the controller 20 of the robot 10 from the controller 20 of the other robot 10'.

In Example 4, as shown in FIG. 13, the storage unit 23 stores data which correlates the distance L3 between the detected position of the object person O and the position of the arm 12 of the other robot 10', with the radius r of the operation limitation area LA. Instead of storing the data, a formula which correlates the distance L3 with the radius r of the operation limitation area LA may be stored in the storage unit 23.

In addition, the control unit 21 changes the radius r of the operation limitation area LA, which is set at the surrounding area of the object person O, in response to the distance L3, on the basis of the operation limitation area calculation program 23c. That is to say, the control unit 21 enlarges the operation limitation area LA at the surrounding area of the object person O when the distance L3 between the object person O and the other robot 10' becomes smaller.

At this time, while the control unit 21 performs the Steps S1-1, and S1-4 to S1-5 of the flow chart shown in FIG. 4, in Step S1-3, the control unit 21 applies the detected distance L3 to the data shown in FIG. 13 so as to reset the radius r of the operation limitation area LA whose center is the position of the object person O. Also, in Example 4, there is a case where Step S1-2 is not necessary to be performed.

Also, in Example 4, data which correlates the distance L3 with the risk degree may be stored in the storage unit 23. In this case, the risk degree which is correlated with the detected distance L3 is applied to the conversion data shown in FIG. 9, and by this, the control unit 21 resets the radius r of the operation limitation area LA whose center is the position of the object person O.

Figures 14, 15:
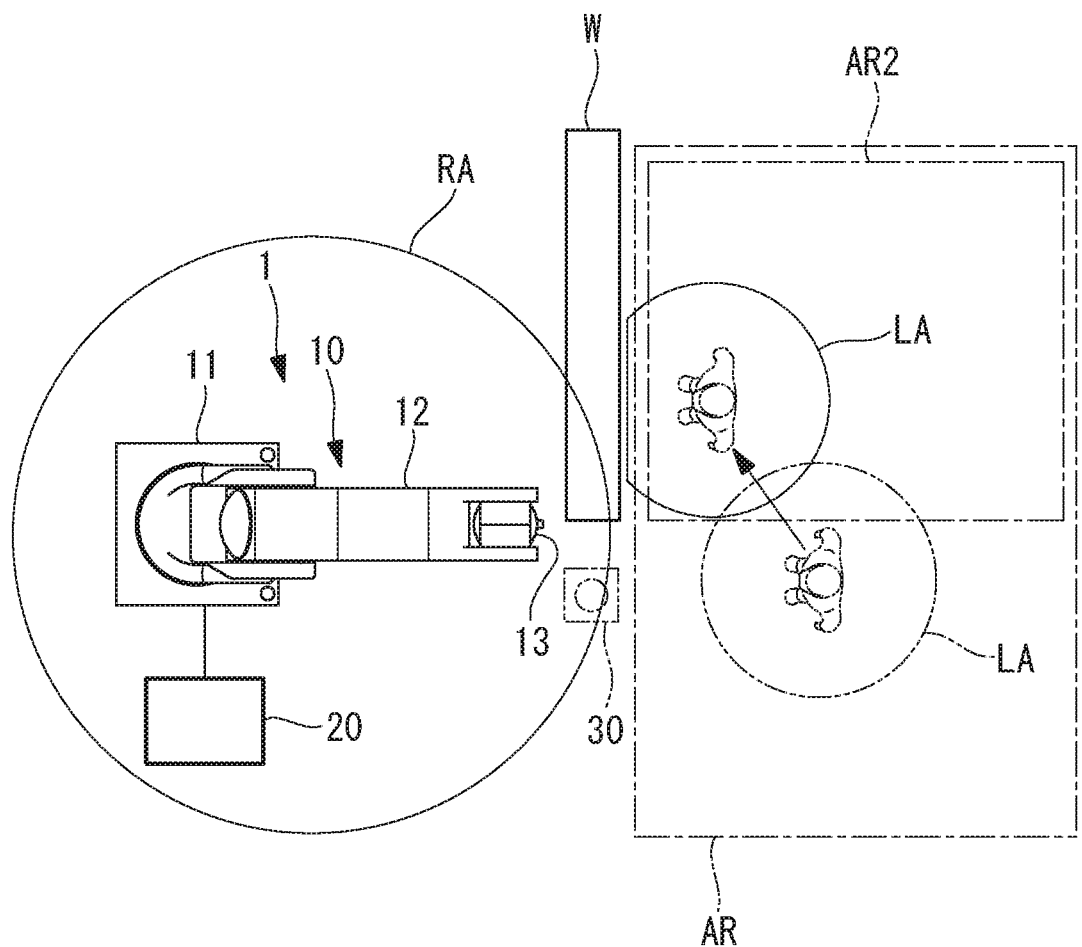
FIG. 14 is an example of the correlation data of the embodiment.
FIG. 15 is an exemplary diagram showing an entire structure of the robot system of the embodiment.

Furthermore, as shown in FIG. 14, data which correlates operation status of the other robot 10' with the risk degree may be stored in the storage unit 23. In this case, a value obtained by adding the risk degree shown in FIG. 14 to the risk degree which is correlated with the distance L3 is applied to the conversion data shown in FIG. 9.

Example 5

The control unit 21 changes the operation limitation area LA set at the surrounding area of the object person O in response to the positions of the object person O with regard to the wall W which is provided at the surrounding area of the robot 10 (refer to FIG. 15). In this example, the wall W exists in the work area AR, or between the work area AR and the robot 10, and as the building information 23e, information about an existence area of the wall W is stored in the storage unit 23. On the basis of the operation limitation area calculation program 23c, the control unit 21 deletes a part of the operation limitation area LA along the wall W when the object person O is located in a predetermined range AR2 which is correlated with the existence area of the wall W. The wall W may be a fence. Information about the predetermined range AR2 may be stored in the storage unit 23.

At this time, while the control unit 21 performs the Steps S1-1, S1-2, and S1-4 to S1-5 of the flow chart shown in FIG. 4, in Step S1-3, the control unit 21 resets the radius r of the operation limitation area LA whose center is the position of the object person O, in response to the detected positions of the object person O with relation to the existence range of the wall W.

Also, in Examples 1 to 5, the object person O may wear a wearable device so that the control unit 21 sequentially obtains the information about the positions of the object person O on the basis of the GPS information of the wearable device. Similarly, in Example 3, the non-target object NO may wear the wearable device so that the control unit 21 sequentially obtains the information about the positions of the non-target object NO on the basis of the GPS information of the wearable device.

Also, in Examples 1 to 5, physical information, such as a pulse, a body temperature, and the like of the object person O may be detected by the wearable device, and the control unit 21 may change the operation limitation area LA at the surrounding area of the object person O in response to the detected physical information about the object person O.

And, in Example 3, the physical information, such as the pulse, the body temperature, and the like of the non-target object NO is detected by the wearable device, and the control unit 21 may change the operation limitation area LA at the surrounding area of the object person O in response to the detected physical information about the non-target object O.

The physical information shows stress status, fatigue status, and the like of the object person O and the non-target object NO. Therefore, changing the operation limitation area LA in response to the physical information is advantageous for securing the safety of the object person O.

In addition, in Examples 1 to 5, the control unit 21 may sequentially obtain the information about the positions of the object person O on the basis of intensity of short-range wireless communication signals of a terminal equipment which is possessed by the object person O. Also, in Example 3, the control unit 21 may sequentially obtain the information about the positions of the non-target object NO on the basis of the intensity of the short-range wireless communication signals of the terminal equipment which is possessed by the non-target object NO.

Like this, in this embodiment, the control unit 21 changes the operation limitation area LA to a direction which is capable of improving the safety of the object person O in response to the information about the floor surface of the work area AR, the information about the structure with which the object person O may come into contact, and the information about the non-target object NO or the other robot 10' existing in the vicinity of the object person O. Therefore, it is possible to secure the safety of the object person O more appropriately.

And, the control unit 21 resets the operation limitation area AR by using the information about the step ST which is provided on the floor surface. The step ST is the structure which may cause the object person O to tumble over or lose the balance. In this embodiment, the operation limitation area LA is changed to the direction which improves the safety of the object person O, which secures the safety of the object person O more appropriately.

Also, the control unit 21 resets the operation limitation area LA by using the information about the slipperiness of the floor surface. When the floor surface is slippery, there is a higher possibility that the object person O tumbles over or loses the balance. In this embodiment, the operation limitation area LA is changed, for example, to the direction which improves the safety of the object person O on the basis of the information about the slipperiness, and therefore, it is possible to secure the safety of the object person O more appropriately.

Further, the control unit 21 resets the operation limitation area LA by using at least one of the information about the structure with which the object person O may be collided, and the information about the structure over which the object person O may be stumbled. In such a case where the structure with which the object person O may be collided, or the structure over which the object person O may be stumbled exists in the work area AR, there is the higher possibility that the object person O tumbles over or loses the balance. In this embodiment, the operation limitation area LA is changed to the direction which improves the safety of the object person O in response to the information about the above described structures existing in the work area AR. And therefore, it is possible to secure the safety of the object person O more appropriately.

Moreover, the information about the wall W or the fence, which is provided at the surrounding area of the robot 10 is stored in the storage unit 23, and the wall W or the fence is capable of preventing the robot 10 from coming into contact with the object person O, and the control unit 21 resets the operation limitation area AL on the basis of the information about the wall W or the fence.

For example, when the wall W is placed between the robot 10 and the object person O, the possibility of the robot 10 coming into contact with the object person O is reduced by virtue of the presence of the wall W. In this situation, the control unit 21 is capable of reducing the size of the operation limitation area LA on the basis of the information about the wall W. Accordingly, it is possible to reduce the size of the operation limitation area LA in response to the situations, and it is possible to prevent the work efficiency of the robot 10 from being lowered, which is caused by the fact that the size of the operation limitation area LA is unnecessarily large.

In addition, in this embodiment, the control unit 21 resets the operation limitation area LA in response to the distance between the object person O and the non-target object NO, and therefore, it is possible to secure the safety of the object person O more appropriately.

And, as the information about the non-target object NO, information about an attribute in the non-target object NO is stored in the storage unit 23, and the control unit 21 may reset the operation limitation area LA on the basis of the distance L2 between the object person O and the non-target object NO, and the information about the attribute in the non-target object NO.

The possibility of the unintentional contact of the object person O and the non-target object NO differs between a case where the non-target object NO is the operator who is well familiar with operations performed by the object person O, and a case where the non-target object NO is the visitor who is not familiar with the operations performed by the object person O. In this embodiment, the operation limitation area LA is reset on the basis of the distance L2 between the object person O and the non-target object NO, and the information about the attribute in the non-target object NO, and therefore, it is possible to secure the safety of the object person O more appropriately.

In this embodiment, the operation limitation area LA is changed in response to the information about the floor surface of the work area AR, the information about the structure with which the object person O may come into contact, and the information about the non-target object NO or the other robot 10' existing in the vicinity of the object person O. In other words, it is possible to reduce the size of the operation limitation area LA in response to the situations, and it is possible to prevent the work efficiency of the robot 10 from being lowered, which is caused by the fact that the size of the operation limitation area LA is unnecessarily large.

Also, in Examples 1 to 5, the control unit 21 may move the positions of the border line at the robot 10 side of the operation limitation area LA, or the positions of the operation limitation area LA itself in response to the information about the floor surface of the work area AR, the information about the structure with which the object person O may come into contact, the information about the non-target object NO or the other robot 10' existing in the vicinity of the object person O. In this case, the same or a similar effect as described above can be achieved.

And, the operation limitation area LA is not necessary be a circular shape which includes the position of the object person O, and the operation limitation area LA can be many other shapes than the circular shape.

Moreover, the sensor 30 may be configured so that the sensor 30 is capable of detecting the information about the object person O and the non-target object NO. In this case, the control unit 21 may receive the position information about the object person O and the position information about the non-target object NO from the sensor 30.

The following aspects are derived from the aforementioned disclosure.

A robot system according to a first aspect of the present invention includes a robot; and a controller which sets an operation limitation area for limiting operations of a robot; wherein, the controller resets the operation limitation area by using at least one of information about a floor surface of a work area where an object person conducts tasks at a surrounding area of the robot, information about a structure with which the object person may come into contact, information about a non-target object who exists in a vicinity of the object person, and information about another robot which exists in a vicinity of the object person.

Like this, for example, the controller changes the operation limitation area to improve safety of the object person in response to the information about the floor surface of the work area, the information about the structure with which the object person may come into contact, the information about non-target object or the other robot existing in the vicinity of the object person. Therefore, it is possible to secure the safety of the object person more appropriately.

With the above aspect, preferably, the robot system includes a storage unit which stores information about a step provided on the floor surface as information about the floor surface; wherein, the controller resets the operation limitation area by using the information about the step.

The step is a structure which can cause the object person to tumble over or lose the balance. In this aspect, the operation limitation area is changed to, for example, the direction which improves the safety of the object person, and therefore, it is possible to secure the safety of the object person more appropriately.

With the above aspect, preferably, the robot system includes a storage unit which stores information about slipperiness of the floor surface as the information about the floor surface; wherein, the controller resets the operation limitation area by using the information about the slipperiness.

When the floor surface is slippery, there is a higher possibility that the object person tumbles over or loses the balance. In this aspect, for example, the operation limitation area is changed to improve the safety of the object person in response to the information about the slipperiness, and therefore, it is possible to secure the safety of the object person more appropriately.

With the above aspect, preferably, the robot system includes a storage unit which stores at least one of information about a structure with which the object person may collide, and information about a structure over which the object person may stumble; wherein, the controller resets the operation limitation area by using at least one of the information about the structure with which the object person may collide, and the information about the structure over which the object person may stumble.

When the structure with which the object person may collide, or the structure over which the object person may stumble exists in the work area, there is the higher possibility that the object person tumbles over or loses the balance. In this aspect, the operation limitation area is changed to, for example, the direction which improves the safety of the object person in response to the information about those structures existing in the work area, and therefore, it is possible to secure the safety of the object person more appropriately.

In this aspect, preferably, the robot system includes a storage unit which stores information about a wall or a fence provided at a surrounding area of the robot; wherein, the wall or the fence is capable of preventing the robot from coming into contact with the object person, and the controller resets the operation limitation area based on the information about the wall or the fence.

For example, when the wall or the fence is placed between the robot and the object person, by virtue of the presence of the wall or the fence, the possibility of the robot of coming into contact with the object person is reduced. In this situation, the controller is capable of reducing the size of the operation limitation area on the basis of the information about the wall or the fence. Accordingly, it is possible to reduce the size of the operation limitation area in response to the situations, and it is possible to prevent the work efficiency of the robot from being lowered, which is caused by the fact that the size of the operation limitation area is unnecessarily large.

In the above aspect, preferably, the controller detects or receives distance between the object person and the non-target object as information about the non-target object, and the controller resets the operation limitation area based on the distance.

When the distance between the object person and the non-target object is short, there is the higher possibility that the object person tumbles over or loses the balance. In this aspect, the operation limitation area is reset in response to the distance between the object person and the non-target object, and therefore, it is possible to secure the safety of the object person more appropriately.

In the above aspect, preferably, the robot system includes a storage unit which stores information about an attribute of the non-target object as the information about the non-target object: wherein, the controller detects or receives the distance between the object person and the non-target object as the information about the non-target object, and the controller resets the operation limitation area based on the distance and the information about the attribute of the non-target object.

The possibility of the unintentional contact of the object person and the non-target object differs between a case where the non-target object is an operator who is well familiar with the tasks of the work performed by the object person, and a case where the non-target object is a visitor who is not familiar with the tasks of the work performed by the object person. In this aspect, the operation limitation area is reset on the basis of the distance between the object person and the non-target object, and the information about the attribute in the non-target object, and therefore, it is possible to secure the safety of the object person more appropriately.

In the above described aspects, the operation limitation area is changed in response to the information about the floor surface of the work area, the information about the structure with which the object person may collide, and the information about the non-target object or the other robot, which exists in the vicinity of the object person. In other words, it is possible to reduce the size of the operation limitation area in response to the situations, and it is possible to prevent the work efficiency of the robot from being lowered, which is caused by the fact that the size of the operation limitation area is unnecessarily large.

According to the above aspects, it is possible to secure safety of an object person, who is a safety monitoring target, more appropriately by considering an environment where the object person conducts tasks.

The invention claimed is:

1. A robot system, comprising:
   a robot;
   a controller which sets an operation limitation area for limiting operations of the robot; and
   a storage unit which stores information about a step on a floor surface as information about the floor surface,
   wherein the floor surface is part of a work area, surrounding the robot, where an object person performs tasks,
   wherein the controller resets the operation limitation area using the information about the floor surface, and
   wherein the controller further resets the operation limitation area using the information about the step.

2. A robot system, comprising:
   a robot; and
   a controller which sets an operation limitation area for limiting operations of the robot; and
   a storage unit which stores information about a slipperiness of a floor surface as information about the floor surface, wherein the floor surface is part of a work area, surrounding the robot, where an object person conducts tasks, and wherein the controller resets the operation limitation area using the information about the slipperiness.

3. The robot system according to claim 1, wherein:

the storage unit stores information about a structure with which the object person may collide and information about a structure over which the object person may stumble, and the controller further resets the operation limitation area using at least one of the information about the structure with which the object person may collide and the information about the structure over which the object person may stumble.

4. The robot system according to claim 1, wherein:

the storage unit stores information about a wall or a fence surrounding the robot;

the wall or the fence is configured to prevent the robot from coming into contact with the object person, and the controller further resets the operation limitation area based on the information about the wall or the fence.

5. A robot system, comprising:

a robot; and a controller which sets an operation limitation area for limiting operations of the robot, wherein the controller resets the operation limitation area using information about a non-target object disposed in a vicinity of an object person, and wherein, after the controller detects or receives a distance between the object person and the non-target object as the information about the non-target object, the controller automatically resets the operation limitation area based on the distance.

6. A robot system comprising:

a robot;

a controller which sets an operation limitation area for limiting operations of the robot; and a storage unit which stores information about an attribute of a non-target object as the information about the non-target object, wherein the controller resets the operation limitation area using information about the non-target object disposed in a vicinity of an object person, and wherein, after the controller detects or receives a distance between the object person and the non-target object as the information about the non-target object, the controller automatically resets the operation limitation area based on the distance and the information about the attribute of the non-target object.

* * * * *